United States Patent [19]
Andersen

[11] Patent Number: 5,244,608
[45] Date of Patent: Sep. 14, 1993

[54] METHOD AND A SYSTEM FOR MANUFACTURING SHAPED OBJECTS OF WOOD DUST

[75] Inventor: Ulrik F. Andersen, Randers, Denmark

[73] Assignee: Mix-Wood ApS, Braband

[21] Appl. No.: 778,210

[22] PCT Filed: Jun. 15, 1990

[86] PCT No.: PCT/DK90/00155
§ 371 Date: Dec. 16, 1991
§ 102(e) Date: Dec. 16, 1991

[87] PCT Pub. No.: WO90/15704
PCT Pub. Date: Dec. 27, 1990

[30] Foreign Application Priority Data

Jun. 15, 1989 [DK] Denmark .............................. 2942/89

[51] Int. Cl.⁵ ........................ B29C 35/12; B29C 45/43
[52] U.S. Cl. ................................... 264/26; 264/328.2; 264/328.16; 264/328.18; 264/335; 264/DIG. 49; 264/DIG. 69; 425/174.8 E; 425/547; 425/437; 425/812; 425/DIG. 46
[58] Field of Search ............... 264/25, 26, 328.2, 45.3, 264/DIG. 69, DIG. 46, 328.16, 328.18, 335, DIG. 49; 425/174.8, 547, 174.8 E, DIG. 13, 812, 437, DIG. 46

[56] References Cited

U.S. PATENT DOCUMENTS

| 2,352,201 | 6/1944 | Jacob | 106/711 |
| 2,407,833 | 9/1946 | Jablonsky | 264/26 |
| 2,697,254 | 12/1954 | Gordon | 264/26 |
| 3,668,286 | 6/1972 | Brooks et al. | 264/26 |
| 3,956,541 | 5/1976 | Pringle | 264/DIG. 67 |
| 4,672,006 | 6/1987 | McGraw | 264/45.3 |
| 5,069,835 | 12/1991 | Oriez et al. | 425/174.8 E |

FOREIGN PATENT DOCUMENTS

53-106764 9/1978 Japan .............................. 264/328.2

Primary Examiner—Jeffery Thurlow
Assistant Examiner—Mathieu Vargot
Attorney, Agent, or Firm—Antonelli, Terry, Stout & Kraus

[57] ABSTRACT

A moulding process and system for producing small wooden objects such as, for example, pipe heads or furniture handles from a moulding material formed of an aqueous suspension of wood dust. The moulding material is injection moulded into injection mould parts in which electrodes are placed for subjecting moulding cavities to a HF-heating field such that both a rapid curing of a heat setting glue agent in the aqueous wood dust mass and a rapid driving out of a major part of the water is realized. The moulding cavities include exhaust or release channels for steam resulting from the evaporation of the water of the moulding material and an arrangement is provided for maintaining the mould parts together in spite of the high steam pressure developed in the mould cavities.

5 Claims, 2 Drawing Sheets

METHOD AND A SYSTEM FOR MANUFACTURING SHAPED OBJECTS OF WOOD DUST

FIELD OF THE INVENTION

The present invention relates to a method of manufacturing moulded bodies based on wood dust, for example, smoking pipe heads.

BACKGROUND OF THE INVENTION

FR-547,636 proposes manufacturing pipe heads by a moulding process by which preferred pipe wood, for example bruyere, can be used in dust form in the moulding mixture holding various binding and curing agents. In the conventional manufacturing of pipes of pure bruyere wood there is a considerable amount of waste and the wood can be utilized much better if the wood is initially used in a dust form as a significant constituent of suitable moulding material for the production of pipe heads. However, in the technical approach proposed in FR-547,636, the moulding substance contains less than 50% of wood, while the remaining components are not environmentally suitable.

Additionally, in U.S. Pat. No. 2,352,201, a moulding of pipe heads is proposed utilizing bruyere dust; however, the product is mainly a plaster product and is unattractive.

SUMMARY OF THE INVENTION

The aim underlying the present invention essentially resides in providing a method by which it is possible to produce moulded bodies such as pipe heads having a very high content of wood dust and being economically producible with a brief processing time of, for example, thirty seconds, as compared with, for example, FR-547,636 requiring a curing time of some sixty hours.

However, the invention goes a step further in proposing a moulding of many other smaller objects of wood other than pipe heads or, for that matter, moulding of larger objects. More particularly, the present invention is based upon the consideration that in the wood laminating technique there has been a considerable remarkable development by which it is possible, by special binding agents and curing methods, to obtain a very effective bonding between thin wooden plates in sandwich products, and, according to the invention, it is possible to achieve a correspondingly effecting binding together of wood particles in a moulding compound which is prepared with an absolute predominance of wood dust and only with the required minimum of binding and curing agents and being subjected to a similar curing treatment.

It is essential that it is possible to hereby produce the moulded bodies with a very high content of wood dust, such that the bodies will get the full character of real wooden products, which, by way of example, can be painted in quite the same manner as adjacent wooden parts, e.g. in case of moulded furniture handles. The same cheap wooden elements, when made by moulding, may even exhibit increased durability, as in the products there will be no weakening veins or stratifications.

The modern binding agents as developed for binding together the plate elements in laminated wood products are both effective and environmentally compatible, and, when it is pertinent in the present connection to bind together tiny wood particles in the form of wood flour or small chips, it may be sufficient to use only a few percent of binding agent, such that the products may consist of, for example, 96% wood, that is, the products will be practically purely wooden products.

With the use of wooden chips the moulding will result in objects having a structured surface, which will not, of course, be similar to a natural wood surface with veins, but when unpainted it will still be more 'living' than, for example, a moulded plastic surface.

The very brief processing time which can be exploited with the invention is based on the use of high frequency heating. The modern, harmless binding agents are water based and are therefore easily heatable for curing by the influence of a high frequency field, which will be true not only when joining wooden plate elements, but also when joining wooden particles in a moulding. For this reason, in connection with the invention, it is possible to operate with such a brief production time that it will be highly economical to produce 'wooden members' by moulding rather than by conventional shaping techniques such a copying cutting.

This may apply to pronounced small wooden objects such as pipe heads or drawer handles, but also to larger objects such as clog soles, tortuous furniture legs or entire door blades.

For the moulding mould parts can be used which are held together with a high pressure. This is required because a violent evaporation of water takes place during the desired rapid heating treatment for the curing of the binding substance, whereby the mould parts are affected away from each other. The water content should be as low as possible, through sufficient for the mixture of wood particles and binding agents to assume a character of a paste having a sufficiently low viscosity for being injectable into the mould cavity or cavities. This injectability, however, can be improved with the use of a minor amount of a lubricant such as carboxy methyl cellulose or polyvinyl alcohol, whereby still less water can be used. The binding agent can suitably be a malamine glue, but more of the glues developed for the production of laminated wood will be applicable.

It is important that the water content be kept as low as possible, because after the brief heating treatment the residual water content in the mouldings should be low, as the mouldings may otherwise tend to crackle.

The mould parts in which the mouldings are made should be constructed from a very rigid material having good dielectric properties, and no metallic parts or even metal chips should be present in the area where the high frequency field is applied. The field may suitable be applied between electrode plates built into the mould parts themselves, such that the mould parts can be situated relatively close to each other at the respective opposite sides of the moulding cavities.

BRIEF DESCRIPTION OF THE DRAWINGS

The above and other objects, features and advantages of the present invention will become more apparent from the following description when taken in connection with the accompanying drawings which show, for the purposes of illustration only, one embodiment in accordance with the present invention, and wherein.

DETAILED DESCRIPTION

Figure 1:
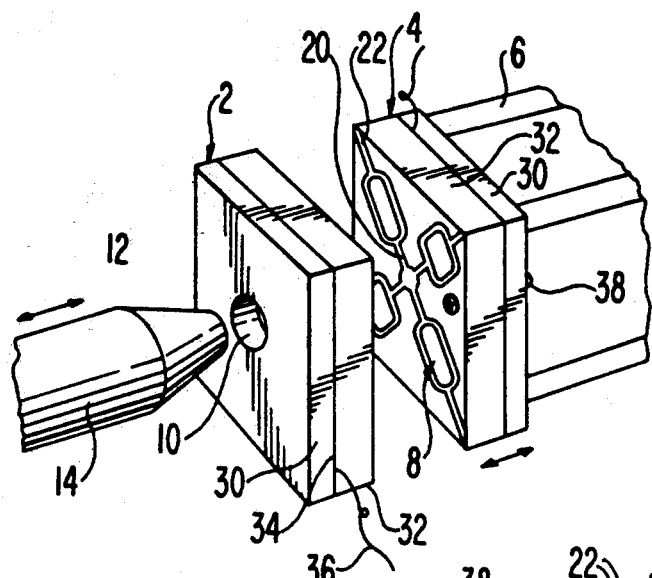
FIG. 1 is a perspective view of a tool set for manufacturing objects according to the present invention.

Referring now to the drawings wherein like reference numerals are used throughout the various views to designate like parts and, more particularly, to FIG. 1, according to this figure, a pair of mould parts 2, 5 are provided, with the mould parts being adapted to be arranged just as the mould parts in an ordinary conventional injection moulding machine for plastic, that is, with a fixed mould part 2 and a movable mould part 4, and with the movable mould part 4 being carried on or by rearwardly projecting metallic rods 6, connected to a mechanism for pushing forward and retracting the mould part 4 to and from a position in which the mould part 4 is pressed firmly against the mould part 2. Cooperating moulding cavities 8 are provided in interfacing front sides of both mould parts 2, 4 and, at a rear side of the mould part 2, a central inlet opening 6 is provided for receiving an injector head 12 on a supply pipe 14. The supply pipe 14 is provided in a conventional manner with a feed worm conveyor (not shown) for conveying the moulding material from a supply container (not shown) to the opening 10. The supply pipe 14 and the injector head 12 are displaceable in an axial direction such that the supply pipe 14 and the injector head 12 can be moved between a projecting position in engagement with the opening 10 and a retracted position spaced therefrom.

Figure 2:
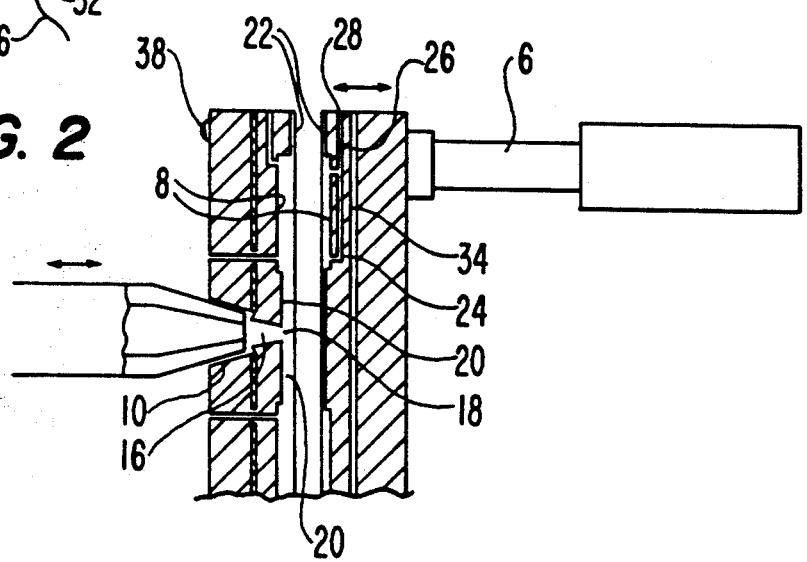
FIGS. 2 and 3 are lateral sectional views of the tool of FIG. 1 with the tool being in a slightly open and fully closed position, respectively.

As shown in FIG. 2, the opening 10 continues in a conical central channel 16 towards the front side of the mould part 2, where it merges into a depressed area 18, from which moulding passages 20 extend to the said moulding cavities 8; from these further passages 22 extend diagonally outwardly to the corners of the moulding part. The front side of the fixed mould part 2 is shaped correspondingly. At different places of the bottom areas of the cavities 8, air holes 24 are provided, connected through channels 26 with outer connector valves for pressurized air, for blowing out the mouldings from the moulding cavities 8

Each of the moulding parts 2, 4 are made from two heavy block plate portions 30, 32 including a very strong resin material with good dielectrical properties, with the plate portions, 30, 32 being tightened together about a metallic intermediate layer or electrode plate 34, which forms an electrode in an HF heating system, and with each of the metal plates being connected to a high frequency generator (not shown) through a wire 36. Usually such electrode plates 34, i.e. anode and cathode, respectively, are made of aluminium, but with the invention it is relevant to transfer such high pressures through these intermediary plates that it is preferred to let the plates include medium hard brass. All edges on the plates should be rounded, also such hole edges which occur around the inlet opening 16 and around throughholes for spanner bolts 38 through the single mould parts.

The electrode plates 34 should be maintained free of metallic parts both in the space between them and in the respective rearward directions, at a minimum distance of some 10 cm. Since the movable mould part 4 is guided by metallic rods 6, the rear block plate portion 30 thereof should thus have a considerable thickness, while the electrode plates may be located quite close to the bottom areas of the moulding cavities 8.

Correspondingly, as far as the fixed mould part 2 is concerned, the rear block plate 30 shall insulate the electrode plate 34 from metallic mounting means at the rear side of the mould part, but here there is the further circumstance that the supply pipe 14,12 for injecting the moulding material is located inside the opening 10, i.e. very close to the electrode plate 34. Therefore, it is necessary that the supply pipe 14 and injector head 12, after each injection, be retracted from the rear side of the mould part 2 to a safe distance from the electrode plate 34 before the HF heating is initiated. If local concentrations of HF energy exist due to the presence of metallic parts in or near the field between the electrode plates 34, then burning or singing of the mould part material will easily occur.

For effecting a moulding operation, the mould parts 2, 4 are pressed firmly together, and the worm pipe 14,12 is moved into engagement with the opening 10, whereafter, the worm conveyor in the supply pipe 14 is actuated to supply a suitable amount of moulding material into the joined mould. The injection pressure may be, for example, but 900 kp/cm$^2$, while the pipe nozzle 12 may engage the opening 10 with a pressure of some 5 tons. The closing pressure between the mould parts 2, 4 has to be considerably higher, e.g. some 200 tons for a moulding volume of 300–400 cm$^3$.

A suitable material for the block portions 30 and 32 as well as for the bolts used for holding together these parts is G-Etronax EP 11 (Elektro-Isola, DK). This material is a glass web/epoxy product, which has good di-electrical properties and is sufficiently pressure and heat resistant.

Figure 3:
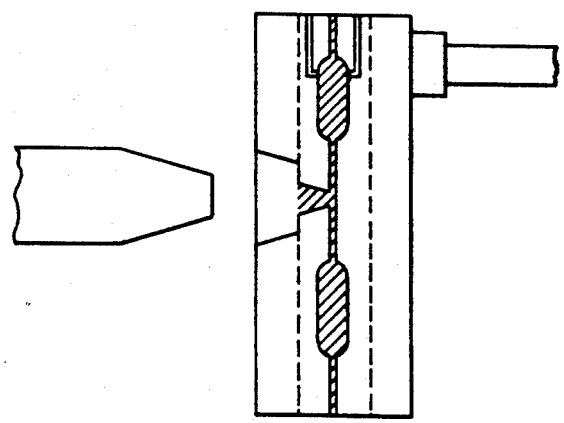

After the injection of the moulding material, the situation will be as shown in FIG. 3. Sufficient moulding material has been introduced for filling the cavities 8 entirely, and preferably this is driven so far that the material, as indicated, comes out of the outer ends of the outer passages 22, whereby the total filling can be ensured by visual inspection from time to time. The injection can take place within a few seconds; whereafter, the nozzle pipe 14,12 is retracted to a position in which its nozzle mouth has been removed e.g. 10 cm from the metallic intermediate layer or electrode plate 34 in the fixed mould part 2.

Figure 5:
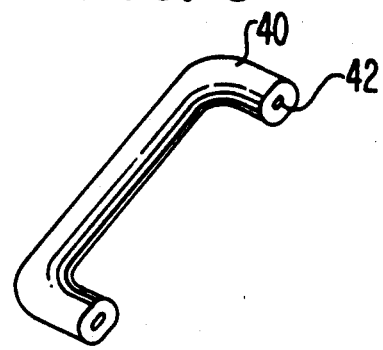
FIG. 5 is a perspective view of another finished product manufactured in accordance with the present invention.

Thereafter, the HF generator is actuated for effecting a powerful heating of the moist moulding material in the moulding cavities, such that the water is driven out by a strong evaporation, for example, out through the outwardly open opening 10 and passages 22. The required heating time may depend of the thickness or volume of the moulding. In the example shown, the moulding is a body for the making of eight furniture handles as shown in FIG. 5, and the total volume of this body may, for example be 325 cm$^3$. A suitable heating time will be 15–20 seconds. While the heating time period is sufficient, it is also possible to make use of a still stronger HF field for driving out the water still more rapidly, but the stability of the moulding system would be jeopardized, as a very high inner steam pressure is created. Preferably, the heating should not be driven beyond some 95°, but generally a temperature range of between 75°–100° should be used, and the applied HF effect should be adjusted accordingly. By its injection into the mould, the moulding material should not give rise to any considerable development of frictional heat, since hereby a hardening of the glue agent may be initiated already prior to the mould being filled. This could speak for a rather high percentage of water, e.g. 20%, but as already mentioned, an alternative is the use of a very small amount of a gliding agent, for example, an amount of 0.1–2.0% of the dry glue material.

Figure 4:
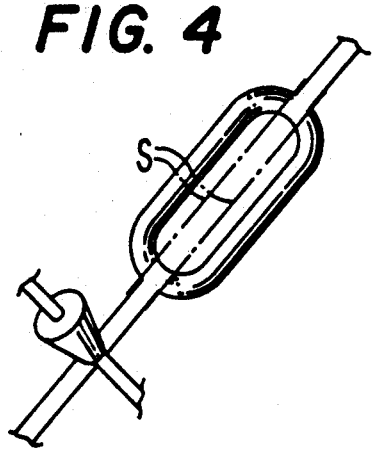
FIG. 4 is a perspective view of a moulding.

After the HF heating the mould parts are separated, whereby the entire, hardened moulding body will remain seated in one of the mould parts. The moulding, as indicated in FIG. 4, is ejected from the mould body by compressed air that is introduced through the channels 26 and the valves 28, these being check valves in order to counteract an intrusion of moulding material into the channels. Upon ejection of the moulding body from the mould part, the moulding body is cut along the dotted lines S in FIG. 4, whereby a total of 4×2 handle members 40 as shown in FIG. 5 are formed. The handle these members 40 may be provided with a drilled hole 42 (FIG. 5) in their respective end faces. By cutting, the handle members 40 will appear with overall unbroken moulding surfaces.

The applied wood dust can range from flour over slip and sawdust to small chips. With the use of semilarge particles, an attractive structuring of the surface of the members can be achieved, what may be desirable for members not to be painted.

As the glue agent, a powder of urea formaldehyde may be used which is mixed with water in the ratio 2:1; whereafter, the mixture is left overnight and is then used for mixing into the dry granular wood in a proportion of approximately 1:4. It is possible, however, to use more advanced types of glue for lowering the glue consumption considerably, e.g. to only a few percent. As an example of such a glue can be mentioned a melamine glue "Melurit 100" (A/S F. Heimann & Co., DK), which is prepared with a hardening agent. Also the gliding agent can be incorporated therein.

It has been found advantageous to use in the mixture of an amount of a puzzolane in the form of spherical flyash with small particle size. Presumably this material is actuated as a binder by the high process pressure.

Figure 6:
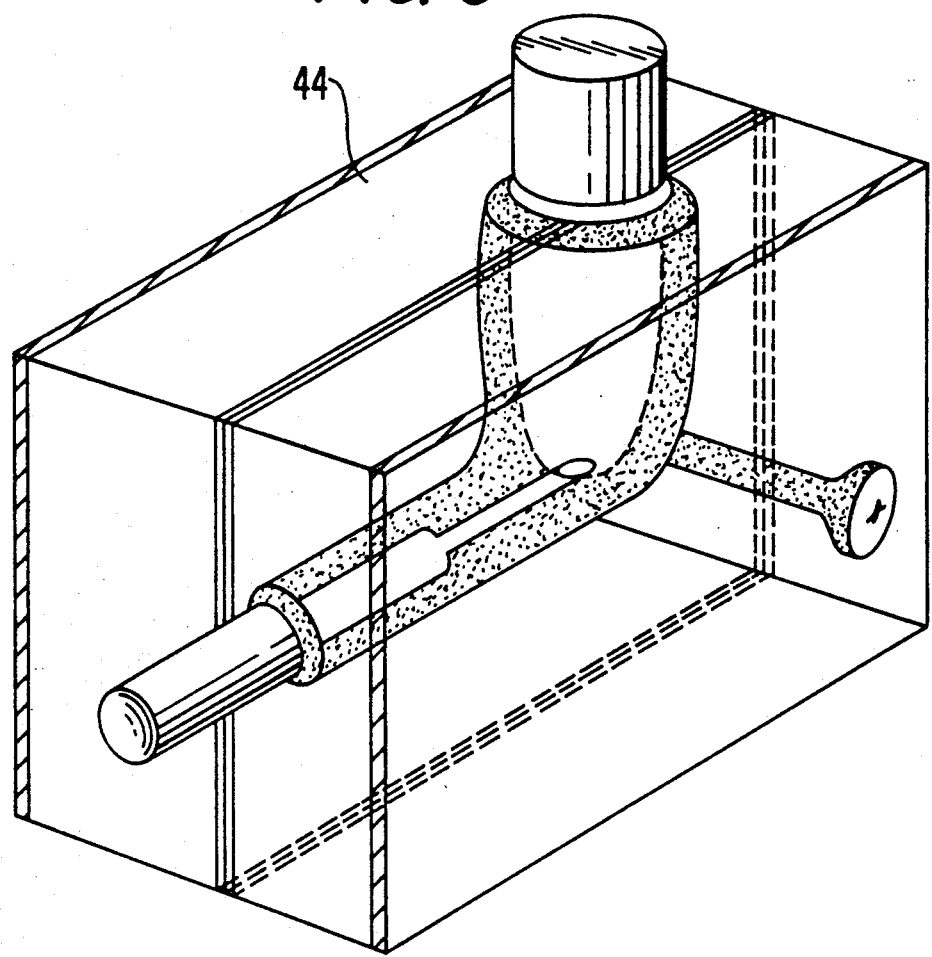
FIG. 6 is an isometric view of a mould for the production of pipe heads.

As shown in FIG. 6, a production tool 44 for pipe heads is provided with HF electrode plates 46 and a core body 48 of a dielectrical material for the shaping of the combustion chamber of the pipe head. It has previously been proposed to produce such heads by moulding, also with the use of bruyere wood dust, but not until the present invention has it been economically possible to establish such a production with the use of a moulding material all-predominantly consisting of the bruyere dust, such that there is now provided a realistic basis for a much better exploitation of the accessible bruyere material.

In the foregoing, the material specified has been 'wood dust', but it should be noted that the invention is not limited to the use of just 'wood', as there are other vegetable materials which can be used such as, for example, straw material.

I claim:

1. A method of manufacturing moulded bodies of a moulding material containing wood dust, a heat activated glue agent and water the method comprising the steps of injection moulding the moulding material into a mould cavity provided in opposed mould parts fashioned of a hard, heat resistant and dielectric material, subjecting the moulded body to an HF heating field between a metallic plate electrode located in the respective tool mould parts spaced behind a bottom portion of the mould cavity so as to promote a curing of the glue agent and promoting an expulsion of the water from the moulded body by evaporation of the water, venting steam resulting from the evaporation through at least one channel connecting the mould cavity with the environment, and, at least initially holding the mould parts together with a pressure sufficient to resist a pressure of steam created by rapid heating of the moulded body.

2. A method according to claim 1, wherein the heat actuated glue is admixed with a lubricant.

3. A method according to claim 1, wherein a process time of the moulding process is approximately 30 seconds or less.

4. A system for manufacturing moulded bodies of a moulding material containing wood dust, a heat activated glue agent and water, the system comprising a mould including mould cavities, means for introducing the moulding material under pressure into the mould cavities, wherein said means for introducing includes an injection moulding system said mould cavities being defined between opposed mould parts of the mould, wherein means are provided for holding said mould parts against each other so as to define said mould cavities, and wherein the mould parts are fashioned of a hard heat resistant and dielectrical material, with each of the mould parts being provided with a metallic HF electrode plate mounted spaced behind respective bottom portions of the mould cavities, and channel means are provided in the mould parts for connecting the mould cavities for communication with the environment for enabling a release of steam caused by evaporation of the water contained in the moulding materials from the moulded bodies.

5. A system according to claim 4, wherein rear sides of said electrode plate are covered by block members of a dielectric material.

* * * * *